(12) United States Patent
Bachmann (10) Patent No.: US 11,885,395 B2
(45) Date of Patent: Jan. 30, 2024

(54) ELECTRIC TRANSMISSION FOR TWO ELECTRIC PRIME MOVERS

(71) Applicant: ZF Friedrichshafen AG, Friedrichshafen (DE)

(72) Inventor: Max Bachmann, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/540,508

(22) Filed: Dec. 2, 2021

(65) Prior Publication Data

US 2022/0290742 A1 Sep. 15, 2022

(30) Foreign Application Priority Data

Mar. 15, 2021 (DE) ...................... 10 2021 202 472.6

(51) Int. Cl.
*F16H 3/72* (2006.01)
*B60K 17/12* (2006.01)

(52) U.S. Cl.
CPC ............. *F16H 3/727* (2013.01); *B60K 17/12* (2013.01); *F16H 2200/0021* (2013.01); *F16H 2200/2005* (2013.01); *F16H 2200/2043* (2013.01)

(58) Field of Classification Search
CPC .......................... F16H 2200/2005–2017; F16H 2200/2038–2043; F16H 3/724–727; F16H 2003/0818; B60K 1/02
See application file for complete search history.

(56) References Cited

U.S. PATENT DOCUMENTS

| 5,067,932 A | 11/1991 | Edwards |
| 6,131,680 A * | 10/2000 | Nii ...................... B60L 15/2009 |
| | | 903/910 |

(Continued)

FOREIGN PATENT DOCUMENTS

| CN | 105751881 A | 7/2016 |
| DE | 69126319 T2 | 1/1998 |
| WO | WO-2007009594 A1 * | 1/2007 ........... F16H 37/046 |

OTHER PUBLICATIONS

German Office Action DE 10 2021 202 472.6, dated Nov. 12, 2021. (10 pages).

*Primary Examiner* — Ernesto A Suarez
*Assistant Examiner* — Lillian T Nguyen
(74) *Attorney, Agent, or Firm* — Dority & Manning, P.A.

(57) ABSTRACT

An electric transmission (10) for a motor vehicle drive train (12) with a first electric prime mover (14) and a second electric prime mover (18), includes a first transmission input shaft (30) having a first transmission connection for drivingly connecting the electric transmission to the first electric prime mover, a second transmission input shaft (32) having a second transmission connection for drivingly connecting the electric transmission to the second electric prime mover, a countershaft (36), gearwheel pairs of idler gears (42, 44, 50, 52, 62) and fixed gears (46, 48, 54, 65, 64) for forming gear steps and arranged in multiple gear set planes, a plurality of shift elements (38, 40) for engaging the gear steps, a planetary gear set (22) with a sun gear (24), a planet gear carrier, and a ring gear (28), and a third transmission input shaft (34) drivingly connected to the planet gear carrier of the planetary gear set. The first electric prime mover is drivingly connected to the ring gear of the planetary gear set, and the second electric prime mover is drivingly connected to the sun gear of the planetary gear set.

13 Claims, 4 Drawing Sheets

(56) References Cited

U.S. PATENT DOCUMENTS

| | | | | |
|---|---|---|---|---|
| 6,491,599 | B1* | 12/2002 | Schmidt | B60K 6/445 |
| | | | | 475/8 |
| 7,172,527 | B2* | 2/2007 | Abe | F16H 3/666 |
| | | | | 475/276 |
| 9,327,713 | B2* | 5/2016 | Kaltenbach | B60W 30/19 |
| 2008/0103002 | A1* | 5/2008 | Holmes | B60K 6/365 |
| | | | | 475/5 |
| 2012/0240723 | A1* | 9/2012 | Gluckler | B60K 6/36 |
| | | | | 903/902 |
| 2013/0267367 | A1* | 10/2013 | Kaltenbach | B60K 6/50 |
| | | | | 475/5 |
| 2014/0100072 | A1* | 4/2014 | Kaltenbach | F16H 37/042 |
| | | | | 475/151 |
| 2019/0077246 | A1* | 3/2019 | Preuss | B60K 6/48 |

* cited by examiner

ELECTRIC TRANSMISSION FOR TWO ELECTRIC PRIME MOVERS

CROSS-REFERENCE TO RELATED APPLICATION

The present application is related and has right of priority to German Patent Application No. 102021202472.6 filed in the German Patent Office on Mar. 15, 2021, which is incorporated by reference in its entirety for all purposes.

FIELD OF THE INVENTION

The present invention relates generally to an electric transmission, a motor vehicle drive train with an electric transmission of this type and to a motor vehicle with a motor vehicle drive train of this type, and to a method.

BACKGROUND

Due to constantly increasing energy costs and a growing environmental awareness, electric vehicles, in particular, are increasingly becoming the focus of the consumer, wherein these types of electric vehicles are presently usually designed as recreational or urban vehicles. This is due, in particular, to a drive power that is reduced in comparison to an internal combustion engine and, primarily, range. Previously, it has been known to equip electric prime movers with transmissions in order to avoid high currents during the starting operation. For this purpose, transmissions are utilized, in particular, of the type already known for internal combustion engines. Spur gear drives have, for example, advantages in the relatively simple design, since few moving parts are utilized and the externally toothed spur gears are comparatively easy to manufacture. One disadvantage is the small ratio that is implementable in one step. In addition, a spur gear drive is larger and, thereby, also heavier than, for example, a planetary transmission given the same power transmission capacity. Moreover, these types of transmissions are usually optimized for internal combustion engines, and so the advantages of electric prime movers can be only insufficiently exploited.

Electric prime movers can be designed, in particular, for high rotational speeds of up to twenty thousand (20,000) revolutions per minute. At high rotational speeds, an open-loop control of electric prime movers is simplified. In particular, low rotational speeds are unfavorable at a high torque. Moreover, electric prime movers have a smaller amount of copper and iron given the same rated power and a higher rotational speed. Therefore, by utilizing a transmission, the same rated power can be achieved at a lower weight of the electric prime mover, wherein a rotational speed of the electric prime mover can be reduced into a desired range by the transmission.

SUMMARY OF THE INVENTION

In view of the above, an improved, compact electric transmission, which, in particular, advantageously implements the properties of electric prime movers, may be provided. Advantageously, an electric transmission and a motor vehicle drive train are to be provided, which, due to properties of the electric transmission and the motor vehicle drive train with regard to small installation space, high variability, and efficient manufacturability, are suitable for a serial production in the automotive industry.

According to example aspects of the present subject matter, an electric transmission for a motor vehicle drive train with a first electric prime mover and a second electric prime mover, includes:
 a first transmission input shaft having a first transmission connection for drivingly connecting the electric transmission to the first electric prime mover;
 a second transmission input shaft having a second transmission connection for drivingly connecting the electric transmission to the second electric prime mover;
 a countershaft;
 gearwheel pairs of idler gears and fixed gears arranged in multiple gear set planes for forming gear steps;
 a plurality of shift elements for engaging the gear steps;
 a planetary gear set including a sun gear, a planet gear carrier, and a ring gear; and
 a third transmission input shaft, which is drivingly connected to the planet gear carrier of the planetary gear set,
 wherein the first electric prime mover is drivingly connected to the ring gear of the planetary gear set and the second electric prime mover is drivingly connected to the sun gear of the planetary gear set.

According to further example aspects of the present subject matter, a motor vehicle drive train for a motor vehicle includes:
 an electric transmission as described above;
 a first electric prime mover, which is drivingly connected to the first transmission input shaft; and
 a second electric prime mover, which is drivingly connected to the second transmission input shaft.

According to further example aspects of the present subject matter, a motor vehicle includes:
 a motor vehicle drive train as defined above; and
 an energy accumulator for storing energy for supplying the first electric prime mover and/or the second electric prime mover.

According to further example aspects of the present subject matter, a method for starting with a motor vehicle drive train as defined above, includes:
 setting the first electric prime mover into rotation in a first direction of rotation;
 setting the second electric prime mover into rotation in a direction of rotation opposite the first direction of rotation, the rotational speeds of the first and second electric prime movers corresponding to a transmission ratio of the planetary gear set such that the planet gear carrier is at rest; and
 changing the rotational speed of an electric prime mover in order to enable a start from a standstill at a high rotational speed of the first and second electric prime movers.

It is understood that the features, which are mentioned above and which will be described in greater detail in the following, are usable not only in the particular combination indicated, but also in other combinations or alone, without departing from the scope of the present invention.

Due to a first and a second transmission input shaft for drivingly connecting the electric transmission to a first and a second electric prime mover, a compact and highly variable electric transmission for two electric prime movers can be created. By a countershaft, the establishment of gear steps can be achieved in a technically simple way and with a compact design. By a planetary gear set, the drive power of the first electric prime mover and of the second electric prime mover can be combined and, by a third transmission input shaft, supplied to the transmission. Preferably, as a result, an electrodynamic starting element, EDA, for the electric prime movers is created. Moreover, an electrodynamic gear shift, EDS, is made possible.

In one advantageous example embodiment, all gear steps are designed for being shiftable without an interruption of tractive force. As a result, the comfort can be increased during gear changes in the transmission. In particular, a sporty transmission can be created.

In one further advantageous example embodiment, the third transmission input shaft is designed as a hollow shaft and encompasses, at least partially or in sections, the first transmission input shaft. As a result, a compact electric transmission can be created. In particular, a first sub-transmission can be created, which is drivingly driven by the third transmission input shaft, and a second sub-transmission, which is driven by the first transmission input shaft.

In one further advantageous example embodiment, at least one gear-forming gearwheel of a first gearwheel pair is arranged at the first transmission input shaft. In addition, at least one gear-forming gearwheel of a second gearwheel pair is arranged at the third transmission input shaft. As a result, it can be technically easily achieved that, during gear changes with respect to the first and/or the second gearwheel pair(s), the drive power is maintained in the particular other gearwheel pair. Moreover, due to such an arrangement, the compactness of the transmission can be further improved.

In one further advantageous example embodiment, all gear-forming gearwheels of the gearwheel pairs are arranged at the first or the third transmission input shaft. As a result, it can be technically easily achieved that driving can take place in a combined manner with both electric prime movers as well as with a single electric prime mover. In the process, in particular, an alternate support can take place during the gear changes in the transmission. Preferably, the second electric prime mover can be designed to be considerably smaller and having less power than the first electric prime mover. As a result, the electric transmission can be designed to be cost-effective and, in particular, having a low installation space requirement.

In one further advantageous example embodiment, the shift elements are designed as form-locking shift elements. Additionally or alternatively, at least two of the shift elements are designed as a double shift element and are actuatable by a double-acting actuator. A double shift element makes it possible to configure the electric transmission with fewer components, since only one actuator must be used to actuate a double shift element, i.e., to engage two-stage gear steps. Moreover, the actuation of the electric transmission is simplified. In addition, the electric transmission is compact, i.e., has a low installation space requirement. Due to the use of form-locking shift elements, the electric transmission can be designed with less loss, i.e., designed to be more efficient. In particular, form-locking shift elements result in a more cost-effective hybrid transmission.

In one further advantageous example embodiment, the first transmission connection is arranged at a first axial end of the electric transmission. In addition, the second transmission connection is arranged at a second axial end of the electric transmission, which is opposite the first axial end. As a result, the available installation space can be advantageously utilized for the first and the second electric prime movers. An electric transmission can be created that is compact and nevertheless efficient.

In one further advantageous example embodiment, the first transmission connection and the second transmission connection are arranged at a first axial end of the electric transmission. In addition, the second transmission input shaft is designed as a hollow shaft and surrounds the first transmission input shaft, at least partially or in sections. As a result, a mounting of the electric prime movers can take place in a simplified manner, since, for example, a common fixing device can be utilized for both electric prime movers. Moreover, a feed flow and supply of electrical energy for the electric prime movers can be simplified, since only one side of the transmission and/or drive train must be wired for the supply.

In one further advantageous example embodiment, the electric transmission has precisely three shift elements and two gearwheel pairs, wherein a first gearwheel pair is drivingly connectable to the first transmission input shaft by a first shift element and is drivingly connectable to the third transmission input shaft by a second shift element. In addition, a second gearwheel pair is drivingly connectable to the third transmission input shaft by a third shift element. As a result, a compactness of the electric transmission can be further improved, since, in particular, the first gearwheel pair can be utilized for both electric prime movers in a mixed operation as well as for the first electric prime mover alone.

In one further advantageous example embodiment, the electric transmission has precisely five shift elements and four gearwheel pairs, wherein a first gearwheel pair is drivingly connectable to the first transmission input shaft by a first shift element, a second gearwheel pair is drivingly connectable to the first transmission input shaft by a second shift element and drivingly connectable to the third transmission input shaft by a third shift element. In addition, a third gearwheel pair is drivingly connectable to the third transmission input shaft by a fourth shift element and a fourth gearwheel pair is drivingly connectable to the third transmission input shaft by a fifth shift element. As a result, a variable and nevertheless compact electric transmission can be created, since, in particular, at least one gearwheel pair can be utilized in the mixed operation as well as by the first electric prime mover alone for transmitting drive power.

In one further advantageous example embodiment, the first electric prime mover is at least partially actuatable as a supporting force means during gear changes of the second electric prime mover. As a result, a shifting of all gear steps without an interruption of tractive force can be achieved in a technically easy manner. In particular, the ride comfort can be improved as a result.

In one further advantageous example embodiment, the first electric prime mover and/or the second electric prime mover are/is designed as a coaxial machine. As a result, a compactness of the drive train can be improved.

An actuator in the present case is, in particular, a component that converts an electrical signal into a mechanical motion. Preferably, actuators that are utilized with double shift elements carry out movements in two opposite directions in order to engage one shift element of the double shift element in the first direction and to engage the other shift element in the second direction.

A fixation of an element of a planetary gear set is to be understood, in particular, as blocking a rotation of the element about the axis of rotation of the element. Preferably, the element is connected, in a rotationally fixed manner, to a static component, such as a frame and/or a transmission housing, by a shift element. It is also conceivable to decelerate the element to a standstill.

An interlock of a planetary gear set includes drivingly connecting two gearwheels and/or the planet gear carrier and one gearwheel of the planetary gear set, and so these rotate together at the same speed about the same point, preferably the center of the planetary gear set. Upon interlocking two gearwheels and/or one planet gear carrier and one gearwheel of the planetary gear set, the planetary gear set preferably operates as a shaft. In particular, no multiplication takes place in the planetary gear set.

A gear step changeover takes place, in particular, by disengaging one shift element and/or a clutch and simultaneously engaging the shift element and/or the clutch for the next higher or lower gear step. The second shift element and/or the second clutch therefore gradually take(s) on the torque from the first shift element and/or the first clutch until, by the end of the gear step changeover, the entire torque has been taken on by the second shift element and/or the second clutch. If synchronization is carried out in advance, a gear change can take place faster. Preferably, form-locking shift elements can be applied.

An electrodynamic starting element, EDA, brings about a speed superimposition of the rotational speeds of a first and a second electric prime mover via one or multiple planetary gear set(s), and so a start of a motor vehicle from a standstill is possible while prime movers are running, preferably without a friction clutch. One electric prime mover supports a torque. Preferably, none of the prime movers is disconnectable from the transmission by a launch clutch, or the like. An EDA is, in particular, so compact that all components have space in the standard clutch housing without lengthening the transmission. Therefore, the prime movers can be operated either simultaneously or alternatively. Due to a good controllability of the electric prime mover, a very high level of starting quality is achieved, which can correspond to that of a drive with a converter clutch.

In the case of an output-assisted gear shift, an electric prime mover is connected with a fixed ratio toward the drive output and supports the tractive force solely under electric motor power, while the other electric prime mover implements a load-free gear shift in the background, as in the case of an automated manual transmission.

In the case of an electrodynamic gear shift, EDS, a speed superimposition of the prime mover rotational speeds takes place via one or multiple planetary gear set(s), as in the case of the EDA starting operation. At the beginning of the gear shift, the torques of the prime movers are adapted, and so the shift element to be disengaged becomes load-free. After this shift element is disengaged, a rotational-speed adaptation takes place while maintaining the tractive force, and so the shift element to be engaged is synchronized. After the engagement of the shift element, the load distribution between the prime movers takes place in any way depending on the operating strategy. The electrodynamic gear change operation (EDS) has the advantage that the shift element of the target gear to be engaged is synchronized due to the interaction of the prime movers, wherein prime movers are preferably precisely controllable by way of a closed-loop system. One further advantage of the EDS gear change operation is that a high tractive force can be achieved, since the torques of the prime movers add up in the transmission.

BRIEF DESCRIPTION OF THE DRAWINGS

Example aspects of the invention are described and explained in greater detail in the following with reference to a few selected exemplary embodiments in conjunction with the attached drawings, in which.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
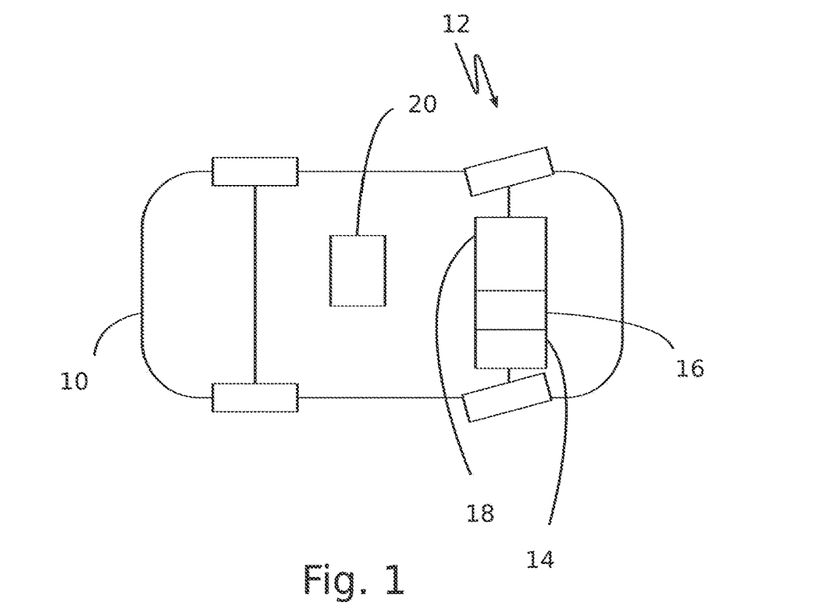
FIG. 1 shows a diagrammatic top view of a motor vehicle with a motor vehicle drive train according to example aspects of the invention.

FIG. 1 diagrammatically shows a motor vehicle 10 having a motor vehicle drive train 12. The motor vehicle drive train 12 includes a first electric prime mover 14 and a second electric prime mover 16, which are connected by an electric transmission 18 to a rear axle of the motor vehicle 10. It is understood that a connection to a front axle of the motor vehicle 10 is also possible. By the motor vehicle drive train 12, drive power of the first electric prime mover 14 and of the second electric prime mover 16 is supplied to the wheels of the motor vehicle 10. The motor vehicle 10 also includes an energy accumulator 20, in order to store energy, which is utilized for supplying the first electric prime mover 14 and the second electric prime mover 16.

Figure 2:
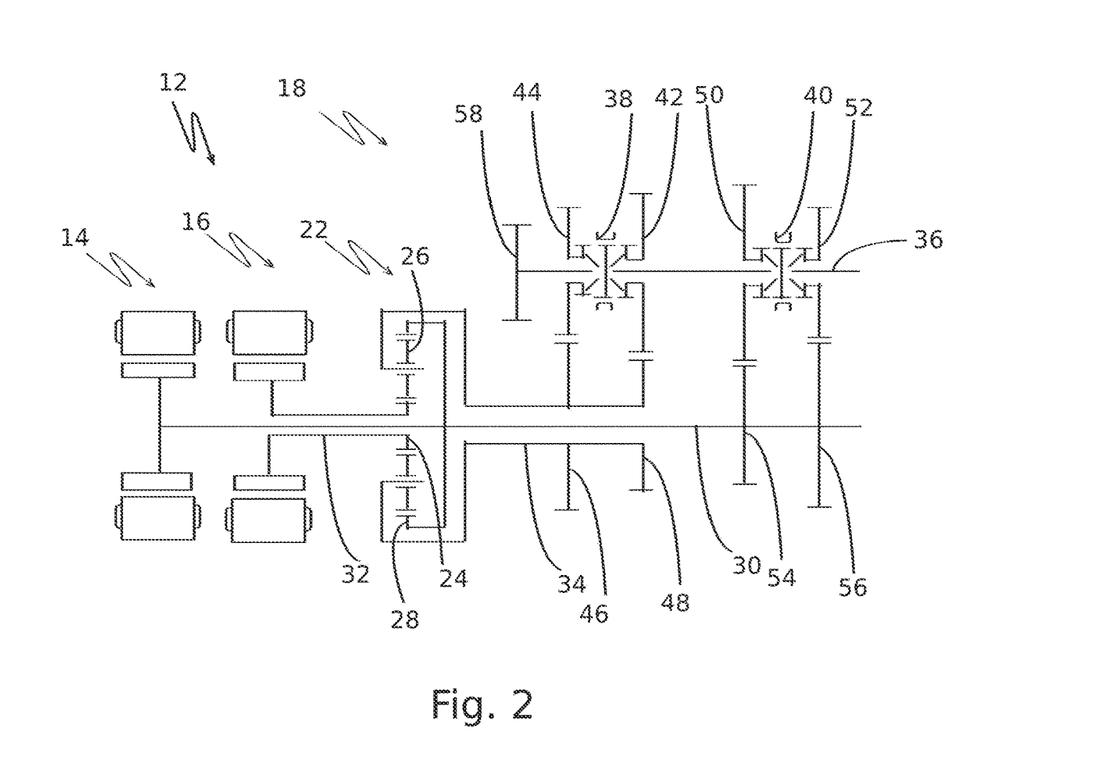
FIG. 2 shows a first example variant of an electric transmission.

A first example variant of an electric transmission 18 is shown in FIG. 2. The electric transmission 18 includes a planetary gear set 22 having a sun gear 24, a planet gear 26, and a ring gear 28. The ring gear 28 of the planetary gear set 22 is drivingly connected to a first transmission input shaft 30. In addition, the first transmission input shaft 30 is drivingly connected at a first transmission connection to the first electric prime mover 14. The sun gear 24 of the planetary gear set 22 is connected to a second transmission input shaft 32, wherein the second transmission input shaft 32 is also drivingly connected to the second electric prime mover 16 at a second transmission connection. A planet gear carrier of the planetary gear set 22 is drivingly connected to a third transmission input shaft 34. A countershaft 36 is arranged axially parallel to the first transmission input shaft 30, the second transmission input shaft 32, and the third transmission input shaft 34. A first shift element 38, which is designed as a double shift element, is arranged at the countershaft 36. In a first shift position, the shift element 38 drivingly connects an idler gear 42 to the countershaft 36. In a second shift position, the shift element 38 drivingly connects an idler gear 44 to the countershaft 36.

The idler gear 44 is in engagement with a fixed gear 46, which is arranged at the third transmission input shaft 34. The idler gear 42 is in engagement with a fixed gear 48, which is also arranged at the third transmission input shaft 34. In addition, a second shift element 40, which is also designed as a double shift element, is arranged at the countershaft 36. In a first shift position, the shift element 40 drivingly connects an idler gear 50 to the countershaft 36. In a second shift position, the shift element 40 drivingly connects an idler gear 52 to the countershaft 36. The idler gear 50 is in engagement with a fixed gear 54, which is arranged at the first transmission input shaft 30. Axially adjacent thereto, a fixed gear 56 is arranged at the first transmission input shaft 30, which is in engagement with the idler gear 52.

Due to the planetary gear set 22, the first electric prime mover 14 may rotate in a direction of rotation opposite that of the second electric prime mover 16, wherein the third transmission input shaft 34 is at rest. As a result, startup is possible, in particular, at comparatively high rotational speeds of the electric prime movers 14, 16 and, in fact, by establishing a speed differential starting from the above-described condition. An open-loop control of the electric prime movers 14, 16 is simplified at higher rotational speeds. In addition, an unfavorable operating range, which has low rotational speeds and a high torque to be applied, can be avoided.

Figure 3:
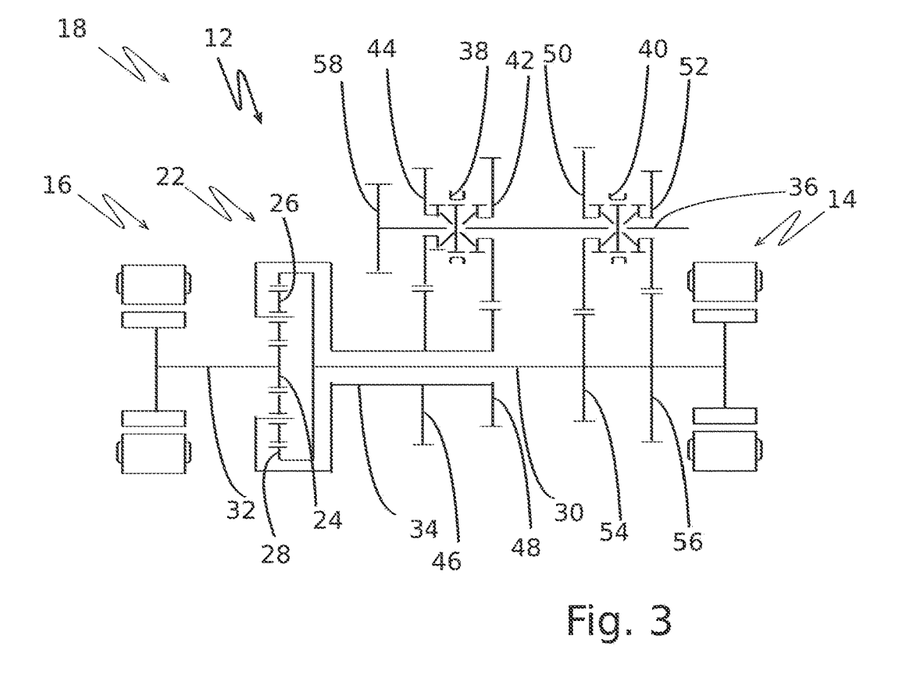
FIG. 3 shows a second example variant of an electric transmission.

A second example variant of an electric transmission 18 is shown in FIG. 3. In contrast to the example variant shown in FIG. 2, the first electric prime mover 14 is arranged at a first axial end of the electric transmission 18, which is opposite a second axial end of the electric transmission 18, at which the second electric prime mover 16 is arranged. As a result, the second transmission input shaft 32 can be designed as a solid shaft, since the second transmission input shaft 32 does not need to surround the first transmission input shaft 30.

Figure 4:
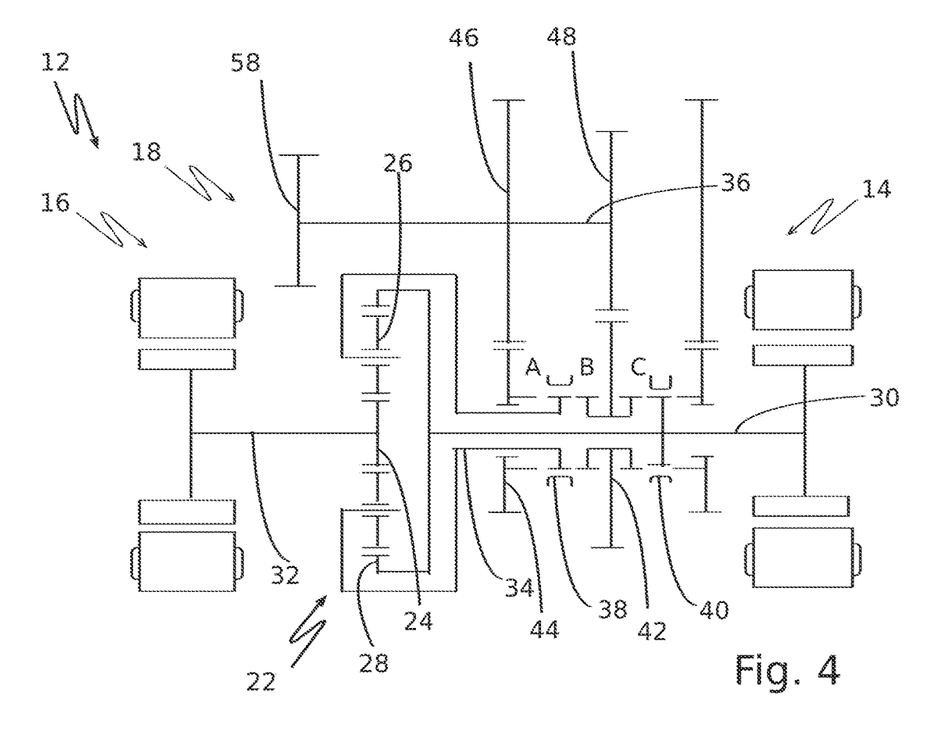
FIG. 4 shows a third example variant of an electric transmission.

A third example variant of an electric transmission 18 is shown in FIG. 4. In contrast to the example variant shown in FIG. 3, the shift elements 38, 40 are arranged at the first transmission input shaft 30 and at the third transmission input shaft 34. The shift element 40 is designed as a single shift element and drivingly connects the idler gear 42 to the first transmission input shaft 30. The shift element 38 is designed as a double shift element and, in a first shift position, drivingly connects the idler gear 42 to the third transmission input shaft 34 and, in a second shift position, drivingly connects the idler gear 44 to the third transmission input shaft 34.

In contrast to the example variant shown in FIG. 3, the idler gear 42 is therefore drivingly connectable to the first transmission input shaft 30 as well as to the third transmission input shaft 34. In this regard, the gearwheel pair consisting of the idler gear 52 and the fixed gear 56 from FIG. 3 can be dispensed with, since the functionality of this gearwheel pair is taken over by the gearwheel pair that includes the idler gear 42 and the fixed gear 48. In addition, the gearwheel pair that includes the fixed gear 54 and the idler gear 50 is dispensed with. For clarification, this gearwheel pair is shown but unlabeled. In terms of the functionality, the example embodiment according to FIG. 4 having the gearwheel pair indicated but not labeled would correspond to the functionality of the example embodiment shown in FIG. 3.

With the example embodiment according to FIG. 4, in particular, the following operating ranges can be established.

In a first operating range, it is possible to start by the gearwheel pair that includes the idler gear 44 and the fixed gear 46. For this purpose, the shift element 38 is therefore to be engaged in a first shift position. Thereupon, the two electric prime movers 14, 16 are to be set into rotation in such a way that the third transmission input shaft 34 is initially at rest.

Starting from this condition, a speed differential can then be established between the rotational speeds of the first electric prime mover 14 and the second electric prime mover 16, preferably until the maximum rotational speed of the second electric prime mover 16 has been reached. As a result, a start or acceleration from a standstill into a second operating range can take place with the electric transmission 18.

The shift element 40 can then be engaged in order to transition into a third operating range. As a result, by the first electric prime mover 14, the tractive force can be supported via the gearwheel pair that includes the idler gear 42 and the fixed gear 48. In particular, as a result, the shift element 38 can become free of torque, and so the shift element 38 can be disengaged. Thereafter, the second electric prime mover 16 can adapt rotational speed to a direct drive of the planetary gear set 22, and so the shift element 38, in a second shift position, can drivingly connect the idler gear 42 to the third transmission input shaft 34. In this shift position, the first electric prime mover 14 and the second electric prime mover 16 can accelerate in direct drive, and so the shift element 40 can be disengaged in a torque-free manner.

In a fifth operating range, the first electric prime mover and the second electric prime mover can accelerate differentially via the planetary gear set 22 up to a maximum rotational speed of the second electric prime mover 16.

Exemplary rotational speeds at the differential for the individual operating ranges are as follows.

In the first operating range, for example, the ring gear 28 of the planetary gear set 22 can rotate at five hundred (500) revolutions per minute, wherein the sun gear 24 of the planetary gear set 22 rotates at negative one thousand, five hundred (−1,500) revolutions per minute. As a result, the planet gear carrier does not rotate. Negative rotational speeds mean, in this case, that rotation takes place in an opposite direction.

In the second operating range, the ring gear 28 can rotate, for example, at two thousand (2,000) revolutions per minute, wherein the sun gear 24 rotates at ten thousand (10,000) revolutions per minute. This results in a rotational speed of the planet gear carrier of four thousand (4,000) revolutions per minute (rotational speed of the planet gear carrier) and a rotational speed at the drive output, i.e., at the output gearwheel 58, of two thousand (2,000) revolutions per minute.

In the third operating range, the ring gear 28 and the sun gear 24 can each rotate at two thousand (2,000) revolutions per minute, which results in a rotational speed of the planet gear carrier of two thousand (2,000) revolutions per minute. In this case as well, the output gearwheel 58 rotates at two thousand (2,000) revolutions per minute.

In the fourth operating range, the ring gear 28 as well as the sun gear 24 can rotate at four thousand (4,000) revolutions per minute, which corresponds to a rotational speed of the planet gear carrier of four thousand (4,000) revolutions per minute. In this case, the output gearwheel 58 also rotates at four thousand (4,000) revolutions per minute.

In the fifth operating range, the ring gear 28 can rotate at four thousand (4,000) revolutions per minute and the sun gear 24 can rotate at ten thousand (10,000) revolutions per minute, which corresponds to a rotational speed of the planet gear carrier of five thousand, five hundred (5,500) revolutions per minute. Therefore, the output gearwheel 58 also rotates at a rotational speed of five thousand, five hundred (5,500) revolutions per minute.

In a first operating range and a second operating range, the shift element 38 is therefore in a first shift position. Upon transition into the third operating range, the shift element 40 is additionally engaged. In the third operating range, only the shift element 40 is engaged. Upon transition from the third operating range into the fourth operating range, the shift element 38 is additionally engaged in a second shift position. This shift position is also maintained in the fourth operating range. In the fifth operating range, the shift element 40 is disengaged.

Due to this advantageous open-loop control, in particular, a sensorless commutation of the electric prime movers 14, 16 is possible, because the rotational speeds of the first electric prime mover 14 and of the second prime mover 16 can be compensated upon startup and, thereby, are freely selectable and, in particular, not equal to zero.

Figure 5:
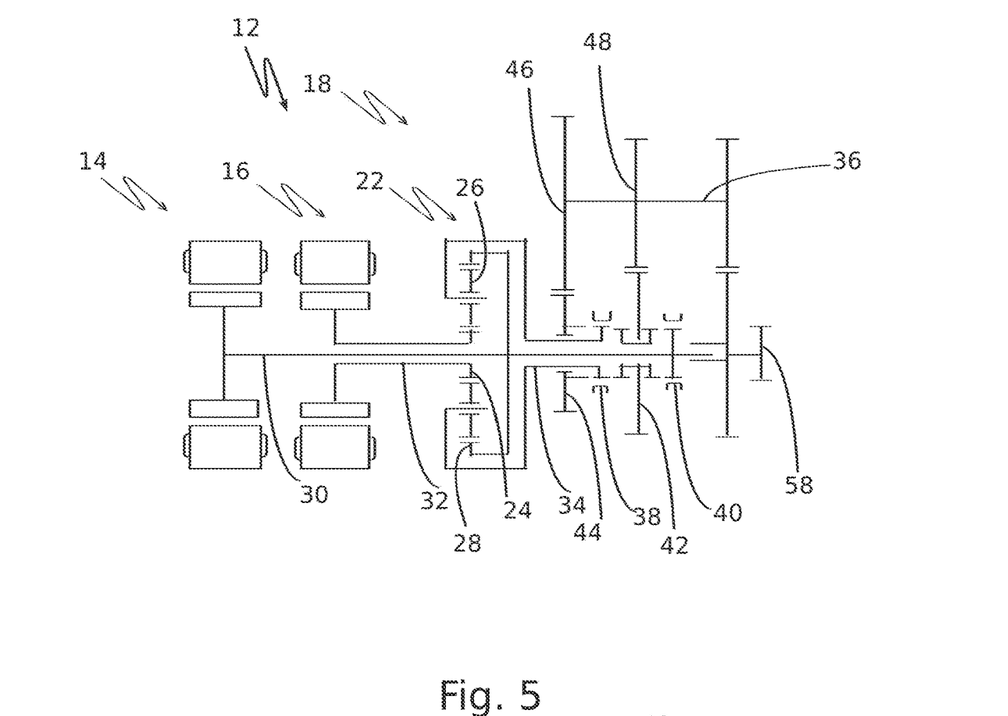
FIG. 5 shows a fourth example variant of an electric transmission.

A fourth example variant of an electric transmission 18 is shown in FIG. 5. In contrast to the example variant shown in FIG. 4, both electric prime movers 14, 16 are arranged at the same axial end of the transmission. As a result, the second transmission input shaft 32 is designed as a hollow shaft and surrounds the first transmission input shaft 30, at least partially or in sections.

Moreover, the drive output is formed by a gearwheel pair, wherein one gearwheel of the gearwheel pair is arranged at the countershaft 36 and one gearwheel of the gearwheel pair is mounted at the first transmission input shaft 30. As a result, in particular, a post-ratio toward the drive output can take place, wherein an axial installation length of the electric transmission 18 is minimally increased.

Figure 6:
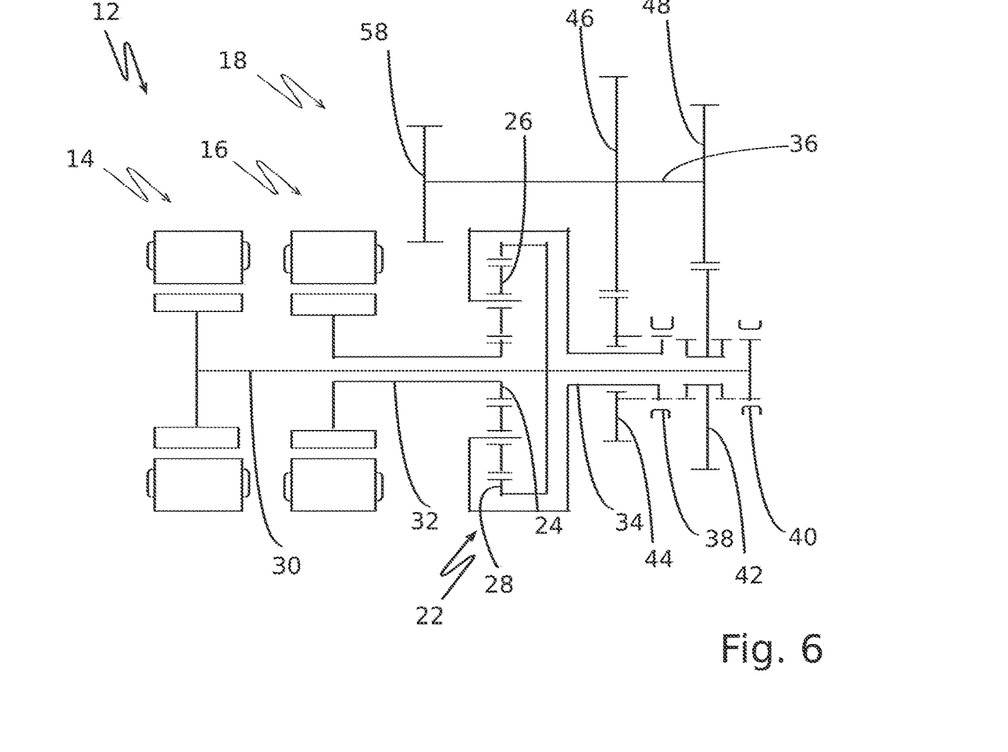
FIG. 6 shows a fifth example variant of an electric transmission.

A fifth example variant of an electric transmission 18 is shown in FIG. 6. In contrast to the example variant shown in FIG. 4, both electric prime movers 14, 16 are arranged at one axial end of the transmission. As a result, as explained above, the second transmission input shaft 32 is designed as a hollow shaft and surrounds the first transmission input shaft 30, at least partially or in sections. The output gearwheel 58 is arranged, as described in the example variant with respect to FIG. 4, at the countershaft 36 and is arranged in the axial direction between the two electric prime movers 14, 16 and the planetary gear set 22.

Figure 7:
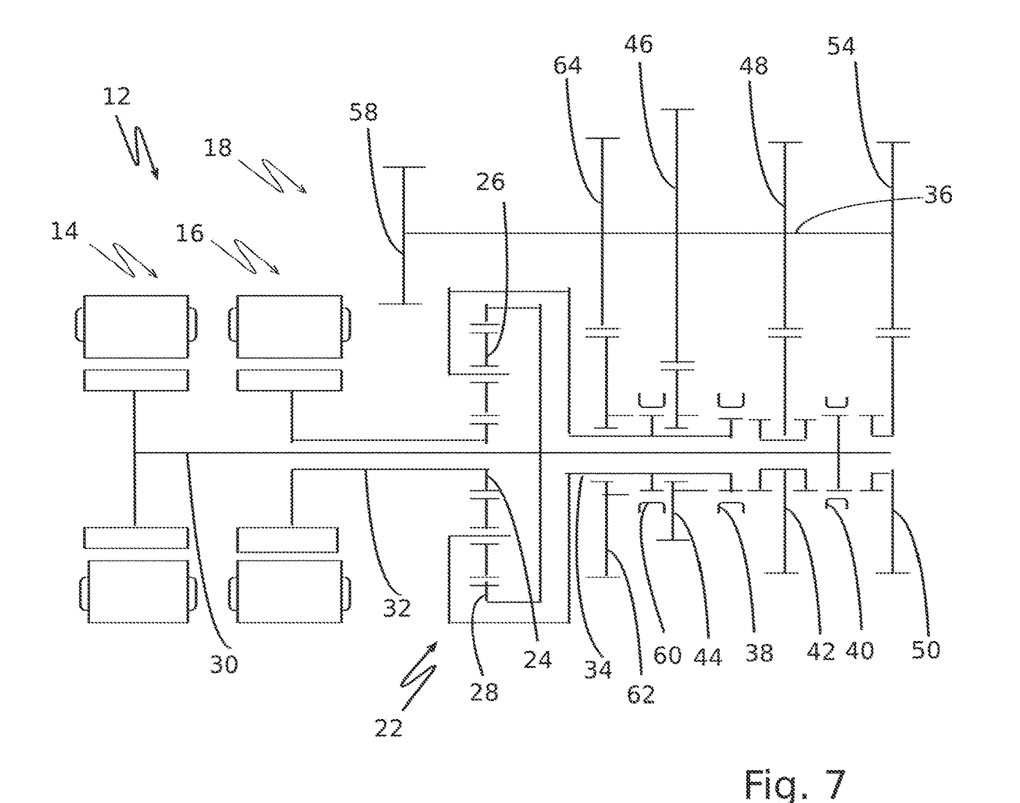
FIG. 7 shows a sixth example variant of an electric transmission.

A sixth example variant of an electric transmission 18 is shown in FIG. 7. The electric transmission 18 according to FIG. 7 includes an additional shift element 60, which is arranged at the third transmission input shaft 34 and can drivingly connect an idler gear 62 to the third transmission input shaft 34. The idler gear 62 is in engagement with a fixed gear 64, which is arranged at the countershaft 36. Moreover, the shift element 40 is designed as a double shift element, wherein the shift element 40, in a second shift position, can drivingly connect an idler gear 50 to the first transmission input shaft 30. The idler gear 50 is in engagement with a fixed gear 54, which is arranged at the countershaft 36.

Due to the additional gearwheel pairs and shift elements, six operating ranges can be passed through with the example embodiment of an electric transmission 18 shown in FIG. 7, wherein the individual operating ranges are preferably situated closer to one another in terms of the ratio. The shift logic results similarly to the above-described shift logic.

In a first operating range, the shift element 38 is moved into a first shift position and drivingly connects the idler gear 44 to the third transmission input shaft 34. In this condition, the two electric prime movers 14, 16 can differentially compensate their rotational speeds by the planetary gear set 22, and so the planet gear carrier of the planetary gear set 22 is at rest.

Starting from this first operating range, a speed differential can then be established in the second operating range, wherein a startup takes place from a standstill, i.e., the planet gear carrier of the planetary gear set 22 is set into rotation.

By engaging the shift element 40 in a first shift position, the first electric prime mover 14 can then maintain the tractive force, and so the shift element 38 becomes load-free and can be disengaged. This takes place in the third operating range, wherein, with the shift element 38 disengaged, the second electric prime mover 16 can adapt rotational speed to a direct drive of the planetary gear set 22, and so the shift element 38 can be engaged in a second shift position and drivingly connect the idler gear 42 to the third transmission input shaft 34. In this shift position, it is possible to drive in the mixed operation with both electric prime movers 14 and 16 by the planetary gear set 22, and so the shift element 40 becomes load-free and can be disengaged.

In the fourth operating range, it is possible to drive differentially with both electric prime movers 14, 16 until a maximum rotational speed of the second electric prime mover 16 is reached.

The load-free shift element 40 can then be engaged in a second shift position and drivingly connect the idler gear 50 to the first transmission input shaft 30. This takes place in the fifth driving range. As a result, the shift element 38 becomes load-free and can be disengaged. As described above, the second electric prime mover 16 can adapt rotational speed to a direct drive of the planetary gear set 22. Additionally, the shift element 60 can be engaged. Here, the second electric prime mover 16 is engaged via the gearwheel pair that includes the idler gear 62 and the fixed gear 64, wherein the first electric prime mover 14 and the second electric prime mover 16 support the gear shift in the direct drive of the planetary gear set 22.

The shift element 40, which is then load-free, can be disengaged and, in a sixth operating range, the two electric prime movers 14, 16 can be differentially operated up to a maximum rotational speed of the second electric prime mover 16.

Exemplary rotational speeds, ratios, and parameters for the individual operating ranges are described in the following.

The first operating range can be driven in a first gear of the electric transmission 18, which has a ratio of, for example, 2.25. Here, the ring gear 28 can be operated at a rotational speed of five hundred (500) revolutions per minute, wherein the sun gear 24 rotates at negative one thousand, five hundred (−1,500) revolutions per minute. The operating range takes place in a first shift position when a shift element 38 is engaged. The described rotational speeds result in a rotational speed of the planet gear carrier of zero.

In a second operating range, driving can also take place with a ratio of 2.25 in the first gear, wherein the ring gear 28 of the planetary gear set 22 rotates at four thousand (4,000) revolutions per minute and the sun gear 24 rotates at a rotational speed of twelve thousand (12,000) revolutions per minute. This operating range also takes place in a first shift position when the shift element 38 is engaged. The above-described rotational speeds result in a rotational speed of the planet gear carrier of six thousand (6,000) revolutions per minute. A drive output can rotate, for example, at two thousand, six hundred, and sixty-six (2,666) revolutions per minute in this operating range.

In order to transition into the third operating range, the shift element 40 is to be engaged in a first shift position and the shift element 38, which is then load-free, is to be disengaged. The third operating range therefore takes place, with the shift element 40 engaged, in a first shift position and can be passed through, for example, in the second gear with a ratio of 1.5. The ring gear 28 and the sun gear 24 can be operated at a rotational speed of four thousand (4,000) revolutions per minute, which results in a rotational speed of the planet gear carrier of four thousand (4,000) revolutions per minute and an output speed of two thousand, six hundred, and sixty-six (2,666) revolutions per minute.

In order to transition into the fourth operating range, the load-free shift element 38 is to be engaged in a second shift position and the shift element 40, which is subsequently load-free, is to be disengaged. The fourth operating range can also be driven with a ratio of 1.5 in the second gear, wherein the ring gear of the planetary gear set 22 can rotate at four thousand (4,000) revolutions per minute and the sun gear 24 of the planetary gear set 22 can be operated at a rotational speed of twelve thousand (12,000) revolutions per minute. The aforementioned rotational speeds then result in a rotational speed of the planet gear carrier of six thousand (6,000) revolutions per minute, which corresponds to an output speed of four thousand (4,000) revolutions per minute.

In a fifth operating range, the shift element 40 can then be engaged in a second shift position. Consequently, driving takes place in the third gear with a ratio of 1.0, wherein the ring gear 28 and the sun gear 24 of the planetary gear set 22 are both operated at four thousand (4,000) revolutions per minute. These rotational speeds correspond to a rotational speed of the planet gear carrier of four thousand (4,000) revolutions per minute, which, at a ratio of 1.0, corresponds to an output speed of four thousand (4,000) revolutions per minute.

In order to transition into the sixth operating range, the shift element 60 is then to be engaged and, thereafter, the load-free shift element 40 is to be disengaged. In the sixth operating range, it is also possible to drive in the third gear with a ratio of 1.0, wherein the ring gear 28 of the planetary gear set 22 is operated at a rotational speed of four thousand (4,000) revolutions per minute and the sun gear 24 is operated at a rotational speed of twelve thousand (12,000) revolutions per minute. The aforementioned rotational speeds then correspond to a rotational speed of the planet gear carrier of six thousand (6,000) revolutions per minute, which, at a ratio of 1.0, corresponds to an output speed of six thousand (6,000) revolutions per minute.

Figure 8:
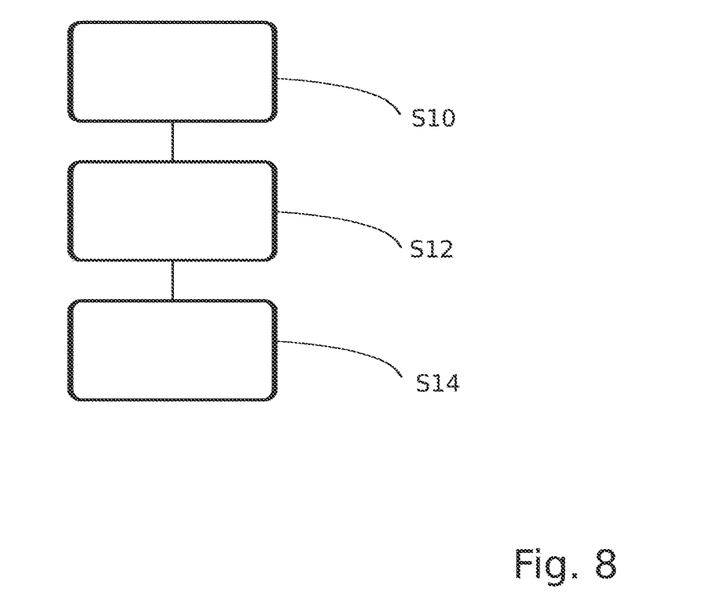
FIG. 8 diagrammatically shows a method according to example aspects of the invention.

FIG. 8 diagrammatically shows a method according to example aspects of the invention. The method includes a start, preferably with a motor vehicle drive train 12 including an electric transmission 18 as described above. In a first step S10, the first electric prime mover 14 is set into rotation in a first direction of rotation. In a step S12, the second electric prime mover 16 is set into rotation in a direction of rotation opposite the first direction of rotation. The rotational speeds of the first electric prime mover 14 and the second electric prime mover 16 correspond to a transmission ratio of the planetary gear set 22, and so the planet gear carrier is at rest. In a step S14, the rotational speed of one of the electric prime movers 14, 16 is then changed in order to set a planet gear carrier of the planetary gear set 22 into rotation and, thereby, set the third transmission input shaft 34 into rotation and supply power to the electric transmission 18. As a result, a start can take place from a standstill at a high rotational speed of both electric prime movers 14, 16. This is advantageous, in particular, since an open-loop control of electric machines can take place in a simplified manner at comparatively high rotational speeds, in particular rotational speeds of more than one hundred (100) revolutions per minute.

The invention was comprehensively described and explained with reference to the drawings and the description.

The description and the explanation are to be understood as an example and are not to be understood as limiting. The invention is not limited to the disclosed embodiments. Other embodiments or variations result for a person skilled in the art within the scope of the utilization of the present invention and within the scope of a precise analysis of the drawings, the disclosure, and the following claims.

In the claims, the words "comprise" and "comprising" do not rule out the presence of further elements or steps. The indefinite article "a" does not rule out the presence of a plurality. A single element or a single unit can carry out the functions of several of the units mentioned in the claims. The mere mention of a few measures in multiple various dependent claims is not to be understood to mean that a combination of these measures cannot also be advantageously utilized. Reference numbers in the claims are not to be understood as limiting.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 10 motor vehicle
12 motor vehicle drive train
14 first electric prime mover
16 second electric prime mover
18 electric transmission
20 energy accumulator
22 planetary gear set
24 sun gear
26 planet gear
28 ring gear
30 first transmission input shaft
32 second transmission input shaft
34 third transmission input shaft
36 countershaft
38 shift element
40 shift element
42 idler gear
44 idler gear
46 fixed gear
48 fixed gear
50 idler gear
52 idler gear
54 fixed gear
56 fixed gear
58 output gearwheel
60 shift element
62 idler gear
64 fixed gear
S10 to S14 method steps

The invention claimed is:

1. An electric transmission (10) for a motor vehicle drive train (12) with a first electric prime mover (14) and a second electric prime mover (18), comprising:
    a first transmission input shaft (30) having a first transmission connection configured for drivingly connecting the electric transmission to the first electric prime mover;
    a second transmission input shaft (32) having a second transmission connection configured for drivingly connecting the electric transmission to the second electric prime mover;
    a countershaft (36);
    gearwheel pairs of idler gears (42, 44, 50, 52, 62) and fixed gears (46, 48, 54, 65, 64) for forming gear steps, the gearwheel pairs arranged in multiple gear set planes, the gearwheel pairs consisting of two gearwheel pairs;
    a plurality of shift elements (38, 40) for engaging the gear steps, the plurality of shift elements consisting of three shift elements (38, 40), a first gearwheel pair (42, 48) of the two gearwheel pairs drivingly connectable to the first transmission input shaft (30) by a first shift element of the three shift elements (38, 40) and drivingly connectable to the third transmission input shaft (34) by a second shift element of the three shift elements (38, 40), a second gearwheel pair (44, 46) of the two gearwheel pairs drivingly connectable to the third transmission input shaft (34) by a third shift element of the three shift elements (38, 40);
    a planetary gear set (22) comprising a sun gear (24), a planet gear carrier, and a ring gear (28); and
    a third transmission input shaft (34) drivingly connected to the planet gear carrier of the planetary gear set,
    wherein the first transmission input shaft (30) is drivingly connected to the ring gear of the planetary gear set, and the second transmission input shaft (32) is drivingly connected to the sun gear of the planetary gear set, and
    wherein all of the gear steps are shiftable without an interruption of tractive force.

2. The electric transmission (18) of claim 1, wherein the third transmission input shaft (34) is a hollow shaft and at least partially encompasses the first transmission input shaft (30).

3. The electric transmission (18) of claim 1, wherein:
    at least one gear-forming gearwheel of a first one of the gearwheel pairs is arranged at the first transmission input shaft (30); and
    at least one gear-forming gearwheel of a second one of the gearwheel pairs is arranged at the third transmission input shaft (34).

4. The electric transmission (18) of claim 1, wherein all fixed gearwheels or all idler gearwheels of the gearwheel pairs are arranged at the first transmission input shaft (30) or the third transmission input shaft (34).

5. The electric transmission (18) of claim 1, wherein one or both of:
    the shift elements (38, 40, 60) of the plurality of shift elements are configured as form-locking shift elements; and
    at least two of the plurality of shift elements (38, 40) are configured as double shift elements and are actuatable by a double-acting actuator.

6. The electric transmission (18) of claim 1, wherein:
    the first transmission connection is arranged at a first axial end of the electric transmission; and
    the second transmission connection is arranged at a second axial end of the electric transmission, which is opposite the first axial end.

7. The electric transmission (18) of claim 1, wherein:
    the first transmission connection and the second transmission connection are arranged at a first axial end of the electric transmission; and
    the second transmission input shaft (32) is a hollow shaft and at least partially encompasses the first transmission input shaft (30).

8. The motor vehicle drive train (12) for a motor vehicle, comprising:
    the electric transmission (18) of claim 1;
    the first electric prime mover (14) drivingly connected to the first transmission input shaft (30); and
    the second electric prime mover (16) drivingly connected to the second transmission input shaft (32).

9. The motor vehicle drive train (12) of claim 8, wherein the first electric prime mover (14) is at least partially actuatable as a supporting force means during gear changes of the second electric prime mover (16).

10. The motor vehicle drive train (12) of claim 8, wherein one or both of the first electric prime mover (14) and the second electric prime mover (16) is configured as a coaxial electric machine.

11. A motor vehicle (10), comprising:
    the motor vehicle drive train (12) of claim 8; and
    an energy accumulator (20) for storing energy for supplying one or both of the first electric prime mover (14) and the second electric prime mover (16).

12. A method for operating the motor vehicle drive train (12) of claim 8, comprising:
    setting the first electric prime mover (14) into rotation (S10) in a first direction of rotation;
    setting the second electric prime mover (16) into rotation (S12) in a second direction of rotation opposite the first direction of rotation, rotational speeds of the first and second electric prime movers corresponding to a transmission ratio of the planetary gear set (22) such that the planet gear carrier is at rest; and
    changing the rotational speed (S14) of one of the first and second electric prime movers (14, 16) such that a start from standstill is implementable by the first and second electric prime movers (14, 16),
    wherein a rotational speed of the first electric prime mover (14) is greater than one hundred revolutions per minute at the start from standstill, and a rotational speed of the second electric prime mover (16) is greater than one hundred revolutions per minute at the start from standstill.

13. An electric transmission (10) for a motor vehicle drive train (12) with a first electric prime mover (14) and a second electric prime mover (18), comprising:
    a first transmission input shaft (30) having a first transmission connection configured for drivingly connecting the electric transmission to the first electric prime mover;
    a second transmission input shaft (32) having a second transmission connection configured for drivingly connecting the electric transmission to the second electric prime mover;
    a countershaft (36);
    gearwheel pairs of idler gears (42, 44, 50, 52, 62) and fixed gears (46, 48, 54, 65, 64) for forming gear steps, the gearwheel pairs arranged in multiple gear set planes, the gearwheel pairs consisting of four gearwheel pairs;

a plurality of shift elements (38, 40) for engaging the gear steps, the plurality of shift elements consisting of five shift elements (38, 40, 60), a first gearwheel pair (50, 54) of the four gearwheel pairs drivingly connectable to the first transmission input shaft (30) by a first shift element of the five shift elements (38, 40, 60), a second gearwheel pair (42, 48) of the four gearwheel pairs drivingly connectable to the first transmission input shaft by a second shift element of the five shift elements (38, 40, 60) and drivingly connectable to the third transmission input shaft (34) by a third shift element of the five shift elements (38, 40, 60), a third gearwheel pair (44, 46) of the four gearwheel pairs drivingly connectable to the third transmission input shaft by a fourth shift element of the five shift elements (38, 40, 60), a fourth gearwheel pair (62, 64) of the four gearwheel pairs drivingly connectable to the third transmission input shaft by a fifth shift element of the five shift elements (38, 40, 60);

a planetary gear set (22) comprising a sun gear (24), a planet gear carrier, and a ring gear (28); and a third transmission input shaft (34) drivingly connected to the planet gear carrier of the planetary gear set, wherein the first transmission input shaft (30) is drivingly connected to the ring gear of the planetary gear set, and the second transmission input shaft (32) is drivingly connected to the sun gear of the planetary gear set, and wherein all of the gear steps are shiftable without an interruption of tractive force.

\* \* \* \* \*